United States Patent [19]
Hidalgo et al.

[11] 4,156,028
[45] May 22, 1979

[54] PROCESS FOR PRODUCING PROTEINIC FILAMENTS OF HIGH NUTRITIVE VALUE

[75] Inventors: Jaime Hidalgo, LaTour-de-Peilz; Olivier de Rham, Vevey; Paul Van de Rovaart, Chexbres, all of Switzerland

[73] Assignee: Societe d'Assistance Technique pour Produits Nestlé S.A., Lausanne, Switzerland

[21] Appl. No.: 774,110

[22] Filed: Mar. 3, 1977

Related U.S. Application Data

[63] Continuation of Ser. No. 655,618, Feb. 5, 1076, abandoned.

[30] Foreign Application Priority Data

Feb. 12, 1975 [CH] Switzerland ............... 1705/75

[51] Int. Cl.$^2$ ............................. A23L 1/00; A23P 1/00
[52] U.S. Cl. ................................. 426/276; 426/583; 426/656; 426/657; 426/517; 426/803
[58] Field of Search ............... 426/276, 583, 656, 657, 426/104, 442, 516, 517, 491, 495, 802, 803; 210/23 F, 42 R, 65; 260/122, 123.5

[56] References Cited

U.S. PATENT DOCUMENTS

| 2,682,466 | 6/1954 | Boyer | 426/802 X |
| 2,952,543 | 9/1960 | Szczesniak et al. | 426/656 X |
| 3,800,053 | 3/1974 | Lange | 426/656 |
| 3,806,611 | 4/1974 | Sawada et al. | 426/276 |
| 3,873,751 | 3/1975 | Arndt | 426/583 |
| 3,882,256 | 5/1975 | Boer | 426/583 |
| 3,900,573 | 8/1975 | Freck et al. | 426/802 X |
| 3,904,775 | 9/1975 | Harwood et al. | 426/657 X |
| 3,922,375 | 11/1975 | Dalan et al. | 426/656 X |
| 3,930,039 | 12/1975 | Kuipers | 426/583 X |
| 3,947,598 | 3/1976 | Stenne | 426/656 X |

OTHER PUBLICATIONS

Jaynes et al, "Preparation of a Fibrous Protein From Cheese Whey", J. Dairy Science, 57 (1), p. 137, 1974.

Primary Examiner—Arthur L. Corbin
Attorney, Agent, or Firm—Watson, Leavenworth, Kelton & Taggart

[57] ABSTRACT

A process for producing proteinic filaments of high nutritive value, which comprises preparing an alkaline solution containing a mixture of proteins consisting essentially of (1) proteins of vegetable origin and (2) proteins of whey and containing up to 50% by weight of proteins of whey, and passing the solution through spinnerets into an acid coagulation bath to form proteinic filaments therein.

8 Claims, No Drawings

PROCESS FOR PRODUCING PROTEINIC FILAMENTS OF HIGH NUTRITIVE VALUE

This is a continuation, of application Ser. No. 655,618, filed Feb. 5, 1976, now abandoned.

This invention relates to a process for the production of edible proteinic filaments of high nutritive value, and to the proteinic filaments thus obtained.

One of the conventional methods of preparing meat substitutes based on vegetable proteins comprises forming filaments from a spinning solution of alkaline pH (known as "dope" in the English-language literature) containing the proteins, washing the filaments thus formed and then subjecting them to more or less complicated technological operations in the presence of various additives so as to form blocks or slabs of which the characteristics are very similar to those of a piece of meat.

Now it is known that meat is a "protein" of high nutritive value, whilst soya proteins, for example, are relatively mediocre in this respect due to the lack of essential amino acids in sufficient quantities, in the present case sulphur-containing amino acids, methionine, cysteine or cystine.

It is difficult to enhance the nutritive value of soya filaments by adding the missing amino acids to the spinning solution because the amino acids are only lost again when the filaments are washed. It is equally difficult to enhance the nutritive value of the end products by adding the amino acids to the washed filaments because these amino acids will be lost during the cooking process, if any. This addition can also give rise to problems on the organoleptic level. It is for this reason that the nutritive value is enhanced by the addition of compounds that are less soluble in water than the amino acids. To this end, it is possible to use spinnable proteins, such as casein.

The present invention enables the nutritive value of filaments of vegetable proteins to be enhanced at moderate cost by utilising an abundantly available commercial by-product, namely whey. The present invention provides a process for producing proteinic filaments of high nutritive value, which comprises preparing an alkaline solution containing proteins which is a mixture of (1) proteins of vegetable origin and (2) proteins of whey and containing up to 50% by weight of proteins of whey, and passing the solution through spinnerets into an acid coagulation bath to form the proteinic filaments therein.

The expression "proteins of vegetable origin", hereinafter abbreviated to "vegetable proteins", applies to proteinic extracts poor in sulphur-containing amino acids, for example those of the type which, as well known in the meat substituted industry, are obtained from such plants as soya, sunflower, ground-nuts, cow peas (Vigna sinesis), maize, horse beans and other varieties of bean, such as broad beans (also known as Lima beans), etc. and, generally, from leguminous plants.

The proteins of whey are the soluble proteins of milk which remain in the aqueous phase when the casein is coagulated under the conditions normally adopted for cheese making or for industrially producing caseins and caseinates, and which are therefore contained in the whey. They are known generically by the name of "lactalbumin" which will be used hereinafter. The lactalbumin is normally isolated by precipitation at the isoelectric pH after thermal denaturation, or by physical separation, in particular by ultrafiltration or gel filtration which gives a non-denatured "native" protein.

Apart from its protein content, i.e. the presence of lactalbumin, the alkaline starting solution or spinning solution is an entirely conventional solution which is in the form of a true solution, a colloidal solution or a more or less viscous gel, depending upon the following parameters: the pH-value in the range from 11 to 14 and preferably from 12 to 13; the concentration of proteins which may amount to as much as 25%, although it is preferably from 5 to 20%; the temperature which is in the range from 20 to 80° C. and preferably in the range from 50 to 65° C. The alkaline agent used is normally a strong base, such as sodium or potassium hydroxide. The dwell time of the alkaline solution before it passes through the spinnerets should be as short as possible in order to avoid excessive damage to the proteins at these high pH-values and temperatures. Nevertheless, it should be long enough for the solution to be homogeneous. It is generally from 1 to 60 minutes, depending upon the particular type of apparatus used, and preferably between 1 and 15 minutes. In general, this alkaline solution also contains non-proteinic substances because the proteinic extracts used are generally not 100% pure. Thus, the vegetable extracts used contain at least 80% and preferably at least 90% of proteins, whilst the "lactalbumin" used contains from 40 to 95% of proteins, 80% being a satisfactory percentage.

The coagulation bath used is a bath of the conventional type with a pH-value in the range from 0 to 4, and, better still, in the range from 1 to 3, the acid used, obviously of food grade, preferably being hydrochloric acid, phosphoric acid, citric acid, acetic acid or lactic acid. As a general rule, it also contains salts, such as sodium or calcium chloride for example.

The proteinic filaments obtained by the process according to the invention are distinguished both by their high nutritive values and also by their favourable mechanical properties. The nutritive value may be measured biologically, for example on the scale of protein efficiency ratios (PER). The PER is defined in the work entitled "Evaluation of Protein Chemistry", National Academy of Sciences and National Research Council, No. 1100 (1963). The nutritive values of the filaments in question are of course governed by the quantities of lactalbumin involved, although PER-values of from 2.2 to 3.2 are readily reached as against values of at most 1.5 and, in some cases, even negative values in the case of soya extracts for example (depending on the treatments to which they have been subjected) and a value of 3.8 in the case of lactalbumin on its own, which is one of the best proteins there is on the nutrition level. By way of illustration, the PER values of casein and beef are of the order of 2.5 to 3. The PER of the filaments increases rapidly up to a percentage content of 40% of lactalbumin in the spinning solution, but only minimally thereafter so that there is no great advantage in exceeding a proportion of the order of 50% of lactalbumin.

Lactalbumin is known to be a protein which cannot be spun in the absence of additives (cf. for example H. O. Jaynes and T. Asan, J. Dairy Sci. 57 (1), 137). Accordingly, it was surprising to find that mixtures of vegetable proteins in lactalbumin could be spun without significant difficulties, above all when these mixtures contained a large percentage of lactalbumin. In addition, it as equally surprising to find that the presence of lactalbumin did not greatly affect the mechanical properties of the filaments obtained. These properties remain more or less stable up to about 30% of lactalbumin coagulated at 130° C. or of ultrafiltered lactalbumin. Beyond that level, the filaments obtained are not as strong as the filaments of pure vegetable proteins, which can be an advantage for the preparation of certain meat substitutes. Finally, beyond 50% of lactalbumin, the filaments become weak, fragile and, for example, cannot be wound onto spools. The mechanical properties of the filaments also vary according to the nature of the lactalbumin. It has been found that, for an equal proportion of lactalbumin, the filaments are stronger, the higher the temperature at which the lactalbumin has been coagulated or if the lactalbumin is an ultrafiltered lactalbumin.

Accordingly, the alkaline starting solution is a solution containing a mixture of vegetable proteins and lactalbumin, with a lactalbumin content of at most 50% and preferably from 20 to 40%.

The application of the process according to the invention does not involve any special factors other than those which are already well-known in the technology of spinning proteins.

One preferred embodiment of the process according to the invention is characterised by the use of soya protein extracts marketed commercially by the Central Soya Company under the trade mark Promine R, and thermally coagulated lactalbumin or, if appropriate, ultrafiltered lactalbumin.

The following Examples illustrate the application of the process according to the invention, the percentages quoted being percent by weight.

BATCH PRODUCTION OF FILAMENTS

The following Examples relate to laboratory tests conducted under extreme conditions. Examples 1 to 8 are intended above all to illustrate the mechanical properties of the filaments obtained; they are summarised in the following Table.

EXAMPLES 1 to 8

885 g of an 18% dispersion in water of proteins according to the Table and 120 g of a 12.5% sodium hydroxide solution are separately prepared, the dispersion and solution are heated to 60° C. and the sodium hydroxide solution is poured slowly while stirring into the protein dispersion. This temperature is maintained for 10 minutes. The liquid thus obtained is then continuously drawn under suction into the flask of a rotary evaporator connected to a water jet pump for deaeration. After all the liquid has been transferred and after the temperature has fallen to the ambient temperature, the liquid, which forms the spinning solution, is passed through a spinneret with 100 bores 100 μm in diameter immersed in a coagulation bath. At the beginning of spinning, the total dwell time of the spinning solution, including the deaeration time, is of the order of 20 to 25 minutes, and about 1 hour on completion of spinning. The filaments obtained, with an average diameter of 97.5 μm, are then liberally washed with hot water (70° C.) to a pH-value of 4.5, followed by centrifuging.

The mechanical properties of the filaments obtained are set out in the Table, in which the so-called "coagulated" lactalbumins are lactalbumins containing 12.5% of nitrogen (i.e. about 80% of proteins) coagulated by heating for 23 minutes at 100° C. or for 5 seconds at 130° C. and then for 20 minutes at 100° C. from a cheese-making rennet whey quality acidified to pH 4.5. Finally, the so-called "ultrafiltered" lactalbumin is a lactalbumin containing 12.5% of nitrogen (i.e. 80% of proteins) obtained by the ultrafiltration on DDS 600 membranes of a cheese-making rennet whey quality.

EXAMPLE 9

Filaments are prepared under the extreme conditions of the preceding Examples by spinning from an alkaline solution containing 60% of Promine R and 40% of ultrafiltered lactalbumin. The PER of the filaments obtained is 1.38±0.08 as compared with −0.16±0.08 for filaments of pure Promine R. Accordingly, the increase in PER amounts to 1.54.

CONTINUOUS PRODUCTION OF FILAMENTS

The following Examples relate to production tests carried out on an industrial scale in which the alkaline treatment of the proteins is brief, i.e. less severe.

EXAMPLE 10

A 13.9% dispersion in water of a mixture of 60% of Promine R and 40% of lactalbumin coagulated at 130° C. (cf. preceding Examples) is prepared. A 7.65% solution of sodium hydroxide is also prepared. The dispersion and the solution are pumped through a heat exchanger kept at 65° C. into a Kenics mixer, after which the liquid obtained is transferred immediately to a vacuum deaeration tower which gives a viscous liquid cooled to 25° C.

TABLE

| | PROTEINS | | | | MECHANICAL PROPERTIES | |
|---|---|---|---|---|---|---|
| Example | nature of lactalbumin | % of lactalbumin | % of Promine R (containing 92% of protein) | Coagulation bath 15% NaCl | breaking load in g/g of washed filaments | elongation at break in % |
| Comparison | — | 0 | 100 | HCl 0.13% | 722 ± 70 | 195 ± 24 |
| 1 | coagulated at 100° C. | 2 | 98 | HCl 0.13% | 304 ± 52 | 69 ± 10 |
| 2 | coagulated at 130° C. | 2 | 98 | CH$_3$COOH 3% | 553 ± 55 | 168 ± 12 |
| 3 | coagulated at 100° C. | 5 | 95 | HCl 0.13% | 364 ± 40 | 57 ± 10 |
| 4 | coagulated at 130° C. | 5 | 95 | CH$_3$COOH 3% | 517 ± 64 | 154 ± 10 |
| 5 | coagulated at 130° C. | 10 | 90 | CH$_3$COOH 3% | 526 ± 62 | 140 ± 14 |
| 6 | coagulated at 100° C. | 20 | 80 | CH$_3$COOH 3% | 650 ± 72 | 27 ± |
| 7 | ultrafiltered | 20 | 80 | HCl 0.13% | 463 ± 67 | 120 ± 18 |
| 8 | ultrafiltered | 20 | 80 | CH$_3$COOH 3% | 613 ± 48 | 172 ± 21 |
| Comparison | coagulated at 100° C. | 100 | — | (non spinnable) | no filaments | |

This liquid is then passed through two spinnerets with 2500 bores 140μm in diameter opening into a 3% acetic acid bath (pH 2.2). The dwell time in the alkaline medium is approximately 5 minutes. The filaments obtained are liberally washed with hot water to a pH-value of the order of 4.5 and then centrifuged. These filaments have a PER of 2.97±0.05 as compared with 1.02±0.23 for pure Promine R spun under the same conditions, and with 3.39±0.03 for lactalbumin coagulated at 100° C. treated under the same conditions (no spinning because it is not spinnable). Thus, these filaments have a high nutritive value.

Before preparation of the spinning solution, the PER-values of the crude mixtures were respectively:

|  |  | Filaments |
|---|---|---|
| Promine R | 1.12 ± 0.17 | 1.02 ± 0.13 |
| 60/40 mixture | 3.09 ± 0.05 | 2.97 ± 0.05 |
| coagulated lactalbumin | 3.74 ± 0.05 | (3.39 ± 0.03) |

Accordingly, it can be seen that spinning involves only moderate PER losses.

EXAMPLES 11 AND 12

The operations described in Example 10 are repeated, the coagulation bath being a hydrochloric acid bath, with Promine R (comparison Example) and mixtures of Promine R and ultrafiltered lactalbumin containing 25% (Example 11) and 40% (Example 12) of lactalbumin.

The following results were obtained:

| Example | Breaking load g/g | Elongation at break in % |
|---|---|---|
| Comparison | 260 ± 50 | 120 ± 10 |
| 11 | 326 ± 20 | 90 ± 3 |
| 12 | 63 ± 18 | 31 ± 9 |

We claim:

1. A process for producing proteinic filaments of high nutritive value, which comprises preparing an alkaline solution having a pH value above 11 and containing a mixture of proteins consisting essentially of (1) proteins of vegetable origin and (2) proteins of whey, wherein the proteins of whey are present in amounts up to 50% by weight, and passing the solution through spinnerets into an acid coagulation bath, having a pH value below 4, to form proteinic filaments therein.

2. A process as claimed in claim 1, wherein the proteins of whey are present in amounts from 20 to 40% by weight.

3. A process as claimed in claim 1, wherein the whey proteins are proteins obtained by coagulation of whey.

4. A process as claimed in claim 1, wherein the whey proteins are proteins obtained from whey by ultrafiltration or gel filtration of the whey.

5. A process as claimed in claim 1, wherein the vegetable proteins are soya proteins.

6. A process as claimed in claim 1, wherein the alkaline solution has a protein concentration of from 5 to 20% by weight.

7. A process as claimed in claim 1, wherein the alkaline solution is a solution containing sodium or potassium hydroxide.

8. A process as claimed in claim 1, wherein the acid coagulation bath is a bath containing hydrochloric acid or acetic acid and at least one acid coagulation bath salt.

UNITED STATES PATENT AND TRADEMARK OFFICE
CERTIFICATE OF CORRECTION

PATENT NO. : 4,156,028
DATED : May 22, 1979
INVENTOR(S) : Process for Producing Proteinic Filaments of High Nutritive Value It is certified that error appears in the above-identified patent and that said Letters Patent are hereby corrected as shown below:

On the front page of the patent, under the heading "Related U.S. Application Data", "Feb. 5, 1076" should read -- Feb. 5, 1976 --.

Col. 1, line 55, "substituted" should read -- substitute --.

Col. 2, line 66, "it as" should read -- it was --.

In the Table at Col. 4, under the heading "elongation at break in %" [the last column at the table], the seventh entry thereunder "27 $\pm$" should read -- 27 $\pm$ 3 --.

In the Table at Col. 5, under the heading "Breaking load", the first entry thereunder "260 $\pm$ 50" should read -- 280 $\pm$ 50 --.

Signed and Sealed this

Eighteenth Day of September 1979

[SEAL]

Attest:

LUTRELLE F. PARKER

*Attesting Officer*   *Acting Commissioner of Patents and Trademarks*